(12) United States Patent
Pilling et al.

(10) Patent No.: US 8,944,419 B2
(45) Date of Patent: Feb. 3, 2015

(54) CONTACT TRAY FOR A MASS TRANSFER COLUMN

(75) Inventors: Mark W. Pilling, Jenks, OK (US);
Stefan Tobias Hirsch, Constance (DE);
Markus Friedrich Fischer, Constance (DE)

(73) Assignee: Sulzer Chemtech AG, Winterthur (CH)

( * ) Notice: Subject to any disclaimer, the term of this patent is extended or adjusted under 35 U.S.C. 154(b) by 1000 days.

(21) Appl. No.: 12/932,476

(22) Filed: Feb. 25, 2011

(65) Prior Publication Data

US 2011/0278745 A1  Nov. 17, 2011

Related U.S. Application Data

(63) Continuation-in-part of application No. 12/800,195, filed on May 11, 2010, now Pat. No. 8,720,870.

(51) Int. Cl.
*B01F 3/04* (2006.01)
*B01D 3/16* (2006.01)

(52) U.S. Cl.
CPC .................................... *B01D 3/163* (2013.01)
USPC ....................................................... 261/114.4

(58) Field of Classification Search
CPC ....................................................... B01D 3/163

USPC ............................................. 261/114.1, 114.4
See application file for complete search history.

(56) References Cited

U.S. PATENT DOCUMENTS

| | | | | |
|---|---|---|---|---|
| 3,173,972 A | * | 3/1965 | Van't Sant | 261/114.4 |
| 3,215,414 A | * | 11/1965 | Van't Sant | 261/114.4 |
| 6,053,485 A | * | 4/2000 | Pan et al. | 261/114.4 |
| 6,270,062 B1 | * | 8/2001 | Chuang et al. | 261/114.4 |
| 6,422,539 B1 | * | 7/2002 | Burton et al. | 261/114.4 |
| 6,799,752 B2 | * | 10/2004 | Wu et al. | 261/114.2 |
| 7,540,477 B2 | * | 6/2009 | Fischer et al. | 261/114.4 |
| 2013/0062793 A1 | * | 3/2013 | Pilling et al. | 261/114.5 |

FOREIGN PATENT DOCUMENTS

GB    1 292 037    * 10/1972

* cited by examiner

*Primary Examiner* — Charles Bushey
(74) *Attorney, Agent, or Firm* — Francis C. Hand; Carella, Byrne, et al

(57) ABSTRACT

The valve cover has a guide vane extending laterally and downwardly from the central portion towards and in spaced relation to the tray deck for deflecting a majority of the vapor passing upwardly through an orifice downward towards the tray deck. A de-entrainment device with a downwardly angled deflector in vertical alignment with an orifice in the tray deck may be integrated or not with the valve cover below the tray deck.

5 Claims, 10 Drawing Sheets

CONTACT TRAY FOR A MASS TRANSFER COLUMN

This is a Continuation-in-Part of Ser. No. 12/800,195 filed May 11, 2010, now U.S. Pat. No. 8,720,870.

This invention relates to a contact tray for a mass transfer column. More particularly, this invention relates to a valve cover for a contact tray for a mass transfer column. Still more particularly, this invention relates to a de-entrainment device for a contact tray for a mass transfer column.

As is known, various types of mass transfer columns have been constructed with contact trays that are arranged throughout the height of the column in spaced apart relation with orifices disposed throughout the trays. In most cases, the trays are arranged so that a downcoming liquid can be directed across each tray and from tray-to-tray in a zigzag manner over the height of the column via downcomers on one side of each tray while an ascending vapor passes through the orifices so that the liquid and vapor can enter into a mass transfer or heat transfer operation. In other cases, the trays have been made as circular dual flow trays so that vapor and liquid compete for travel through the orifices in each direction. In large columns with high liquid rates, multiple downcomers and multiple tray deck zones are used at each tray elevation.

In some cases, such as described in U.S. Pat. Nos. 3,463,464 and 6,588,736, fluid deflector members are located directly above each orifice in a tray deck in order to prevent the liquid from passing downwardly though the vapor-introducing orifices formed in the trays. As described, the deflector members are formed out of the trays in an integral manner. While a tray of this type is relatively strong due to the integral construction of the deflector members within the tray deck, the lift heights of the deflector members, particularly in brittle materials, has been limited. That is to say, since the formation of the deflector members requires the material to stretch to a length greater than the depth of the material, the combination of significant elongation and brittle material can cause the deflector members to crack during the forming process.

U.S. Pat. Nos. 5,911,922 and 5,762,834 describe bridge members that can be mounted across the orifices of a contact tray and that function as movable valves. These bridge members have required slots to be formed in the contact tray adjacent to an orifice in order to mount the legs of the bridge members. As a result, the bridge members have been rather cumbersome to install.

U.S. Pat. No. 5,360,583 describes fluid deflector members that are integral with a tray as well as a fluid deflector member that is movable with respect to a tray and that has outturned feet to limit upward movement relative to a deck. However, such a construction is difficult to install.

U.S. Pat. No. 7,540,477 describes a tray valve for a tray column that is of relatively simple construction.

SU 1369740 describes a mist eliminator that relies on a series of coupled two-deck devices.

Mass transfer columns have also been constructed with contact trays that cooperate with de-entrainment devices to collect entrainment, i.e. liquid carried with the vapor upwardly from a tray deck opposite to the intended direction, before the entrainment reaches the tray deck above and distributes the entrainment back to the tray deck below.

Accordingly, it is an object of the invention to provide a valve cover for a contact tray of relatively simple construction.

It is another object of the invention to increase the capacity of the tray containing valve covers.

It is another object of the invention to improve the entrainment resistance of a tray in a tray column.

It is another object of the invention to provide a valve cover that can be easily mounted on a tray.

It is another object of the invention to provide a valve cover that can fixedly mounted on a tray deck or allowed to move up and down relative to a tray deck.

Briefly, the invention provides a contact tray for a mass transfer column comprised of a tray deck having a plurality of orifices for passage of an ascending vapor therethrough and a plurality of valve covers positioned over the orifices to control the passage of vapor.

Typically, a plurality of horizontal tray decks are disposed in spaced vertical relation within a tower and means are provided for directing a flow of liquid laterally across each tray deck in a sequential manner from top to bottom of the tower.

Each valve cover is mounted on the tray deck and may be of any suitable shape, such as, a multi-chordal shape or a semi-circular shape. For example, one preferred shape is a valve cover that has a central portion disposed in spaced relation to the tray deck and over a respective orifice and a pair of legs extending from opposite ends of the central portion onto the tray deck.

In accordance with the invention, each valve cover has at least one guide vane extending laterally and downwardly from the central portion towards the tray deck for deflecting at least a part of the vapor ascending through a respective orifice towards the tray deck. These guide vanes direct the vapor flow more laterally and into the liquid on the tray deck and were found to unexpectedly produce a significant increase in capacity of the tray containing these valves.

Each valve body may be made of solid construction, i.e. without holes, or with one or more holes, for example, with an opening in the central portion and/or an opening in the leg in the front of the valve cover.

In one embodiment, the valve cover and tray deck orifices are constructed as described in US 2009/0134533, the disclosure of which is incorporated herein, and the valve covers are provided with a guide vane on each lateral side of the central portion that extends laterally and downwardly towards the tray deck for deflecting at least a part of the vapor ascending through a respective orifice towards the tray deck.

In another embodiment, the valve cover is provided with means for engaging the tray deck to prevent lifting of the valve cover from the tray deck. For example, this means may be a deformable tab that extends from at least one of the sloped portions through a slot in the tray deck to abut an underside of the tray deck when deformed as by being twisted.

The valve cover may also be provided with means for engaging the tray deck to allow lifting, i.e. an up and down movement, of the valve cover from the tray deck a predetermined amount. This means may be an extension that extends from each leg and includes a first portion that extends through the orifice in the deck, a second portion that extends downwardly from the first portion and towards a second portion of the other extension and a U-shaped portion extending upwardly from the second portion and defining a pair of prongs spaced from the tray deck a predetermined distance for abutting an underside of the tray deck in response to lifting of the valve cover relative to the tray deck.

In another embodiment, the valve covers are provided with panels between the guide vanes and the adjacent leg of the cover to provide for a more uniform flow of vapor from the sides of the valve cover and downwardly onto the tray deck.

The invention also provides a de-entrainment device having a downwardly angled deflector for positioning in vertical alignment below an orifice in the tray deck to collect entrainment before the entrainment reaches the tray deck and distributes the entrainment back to the tray deck below.

In one embodiment, the deflector may be formed from the orifice in the tray deck.

In another embodiment, the deflector may be formed of a pair of longitudinally extending blades that are disposed in angular relation to each other. The sloping of the blades is such that liquid drains towards the outlet of the tray deck below thereby helping to transport the liquid forward on that tray deck. In this embodiment, the deflector may have a vertically disposed leg connecting the deflector to one of the legs of a valve cover to form a one-piece structure.

Such a one-piece structure may be readily mounted in an orifice of the tray deck by passing the deflector first through the orifice and then turning the structure to position the valve cover over the orifice. Where the one-piece structure has a valve cover as described in US 2009/0134533, the sloped legs of the valve cover from which the deflector extends may be positioned within an end section of the orifice. Where the one-piece structure has a valve cover with a deformable tab at the end of a leg, the tab may be passed through a slot provided therefor in the tray deck. Thereafter, the deformable tab may be twisted to secure the one-piece structure to the tray deck. In this case, only the one leg of the valve cover has a deformable tab.

In another embodiment, the deflector may have a pair of vertically disposed legs extending from the deflector for mounting of the deflector directly to the tray deck.

These and other objects and advantages of the invention will become more apparent from the following detail and description, taken in conjunction with the accompanying drawings wherein.

Figure 11:
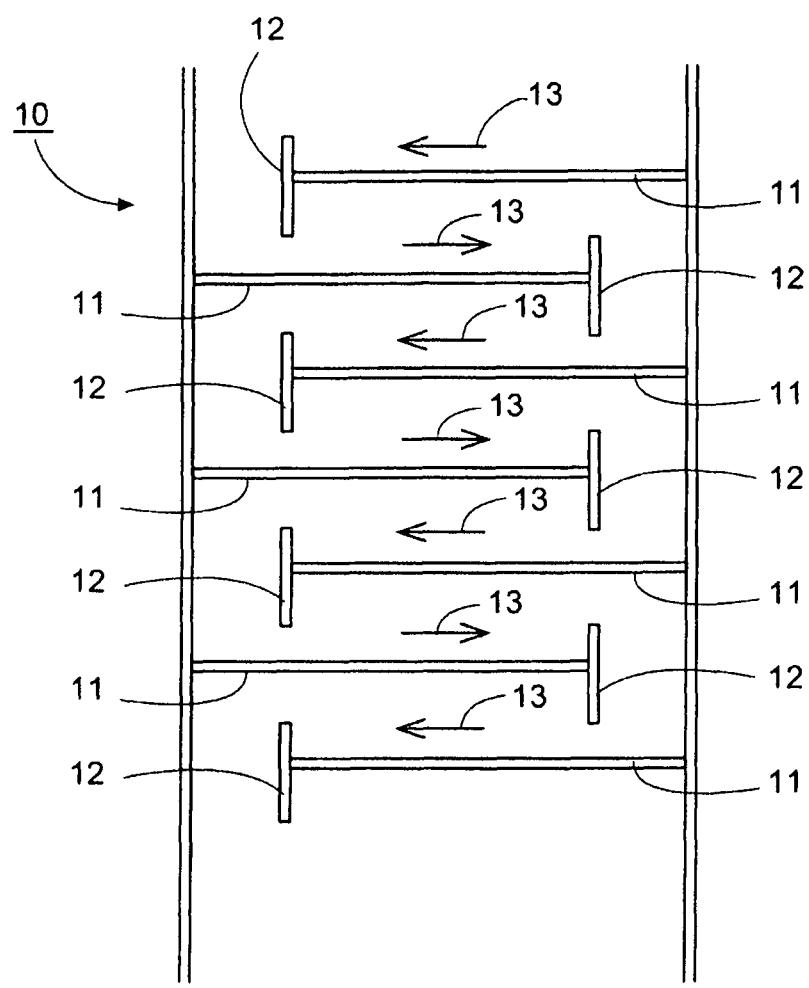
FIG. 11 illustrates a schematic view of a tower employing a series of vertically disposed contact trays in accordance with the invention.

Referring to FIG. 11, the tower 10 is disposed on a vertical axis and is constructed in a conventional manner. As indicated, the tower 10 contains a plurality of horizontally disposed contact trays 11 that are disposed over the height of the column 10 in spaced vertical relation to each other and a plurality of downcomers 12. The downcomers 12 are constructed in a conventional fashion to communicate one side of a respective contact tray 11 with an opposite side of the contact tray 11 immediately below in order to direct a flow of liquid 13 horizontally across the respective contact trays in a zigzag manner. In some cases, there may be more than one downcomer per tray 11.

Figure 1:
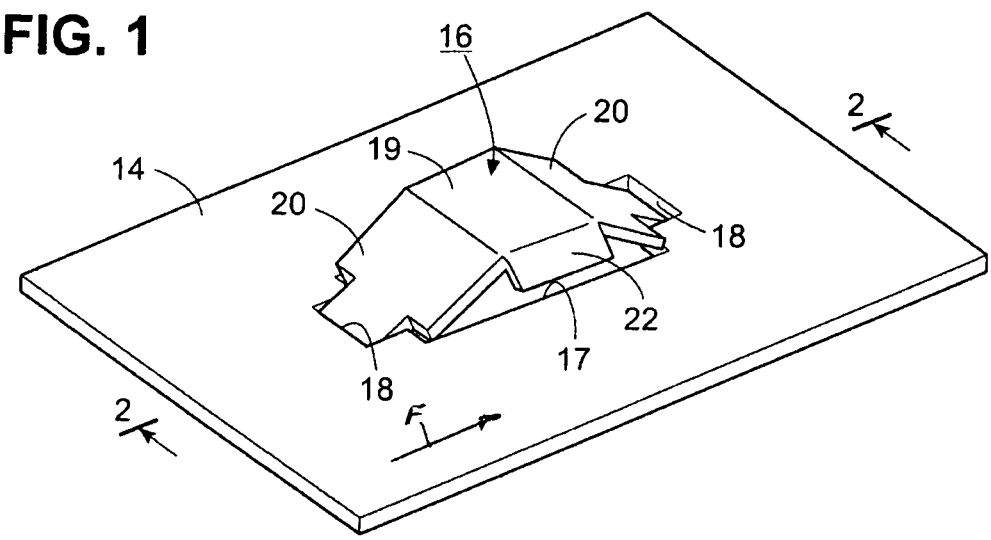
FIG. 1 illustrates a perspective view of a section of a tray deck with a valve cover in accordance with the invention.
Figure 2:
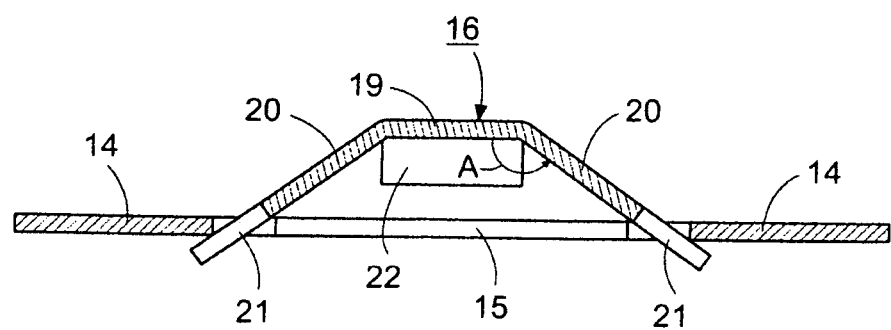
FIG. 2 illustrates a view taken on line 2-2 of Fig.

Referring to FIGS. 1 and 2, each contact tray 11 has a tray deck 14 that has a plurality of orifices 15 for passage of an ascending vapor therethrough for mass transfer or heat transfer with the liquid as well as a plurality of valve covers 16 for preventing the liquid from passing through the orifices 15 and to direct the flow of vapor laterally of the orifices 15.

Each orifice 15 is shaped as described in US 2009/0134533 with a central section 17 and a pair of rectangular end sections 18 of smaller width that extend from opposite ends of the central section 17.

Each valve cover 16 is mounted over a respective orifice 15 and has a central portion 19 disposed in spaced relation to the tray deck 14 and over a respective orifice 15 and a pair of legs 20 that extend from opposite ends of the central portion 19 in a sloped manner onto the tray deck 14. Each leg 20 has a reduced end section forming a tab 21 that fits into an end section 18 of an orifice 15.

The central section 17 of an orifice 15 is of trapezoidal shape. In this case, one leg 20 of the valve cover 16 is narrower than the other leg 20 and positioned on the downstream side of the orifice 15 relative to the liquid flow F (see FIG. 1). Therefore, the vapor leaving the valve cover 16 has a slight pushing component that helps the liquid move across the tray deck 14. This appears to help in capacity and maybe efficiency to force a plug flow of liquid across the deck 14.

Figure 5:
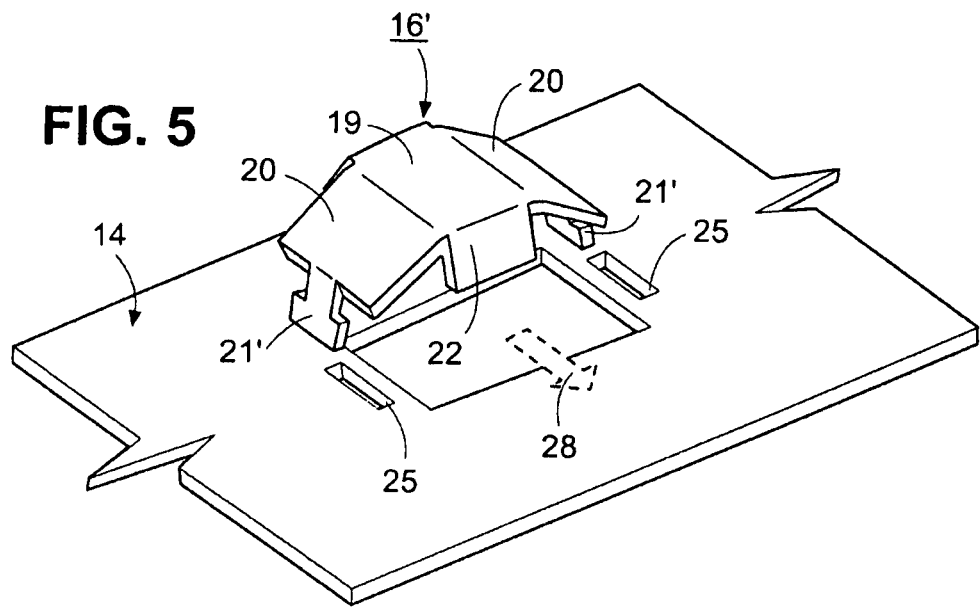
FIG. 5 illustrates an exploded view of a valve cover and tray deck with a schematic indication of the directions of flow of vapor from the valve cover.
Figure 6:
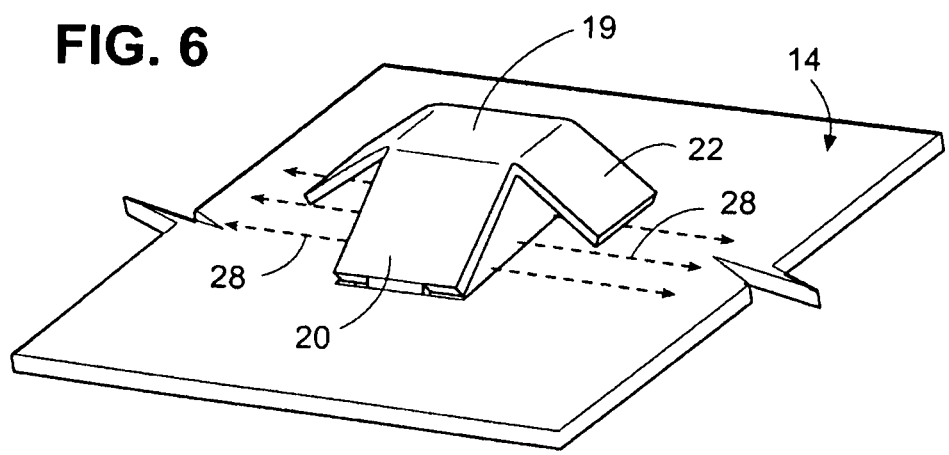
FIG. 6 is a simulation of a vapor flow pattern through a valve cover in accordance with the invention.

Referring to FIGS. 1 and 2, each valve cover 16 is provided with one or more guide vanes 22 on the side of the central portion 19 that extend laterally and downwardly from the central portion 19 towards and in spaced relation to the tray deck 14 for deflecting at least a part of the vapor ascending through a respective orifice 15 towards the tray deck 14, as indicated by the arrows 28 in FIG. 5 and the simulation of FIG. 6.

Figure 3:
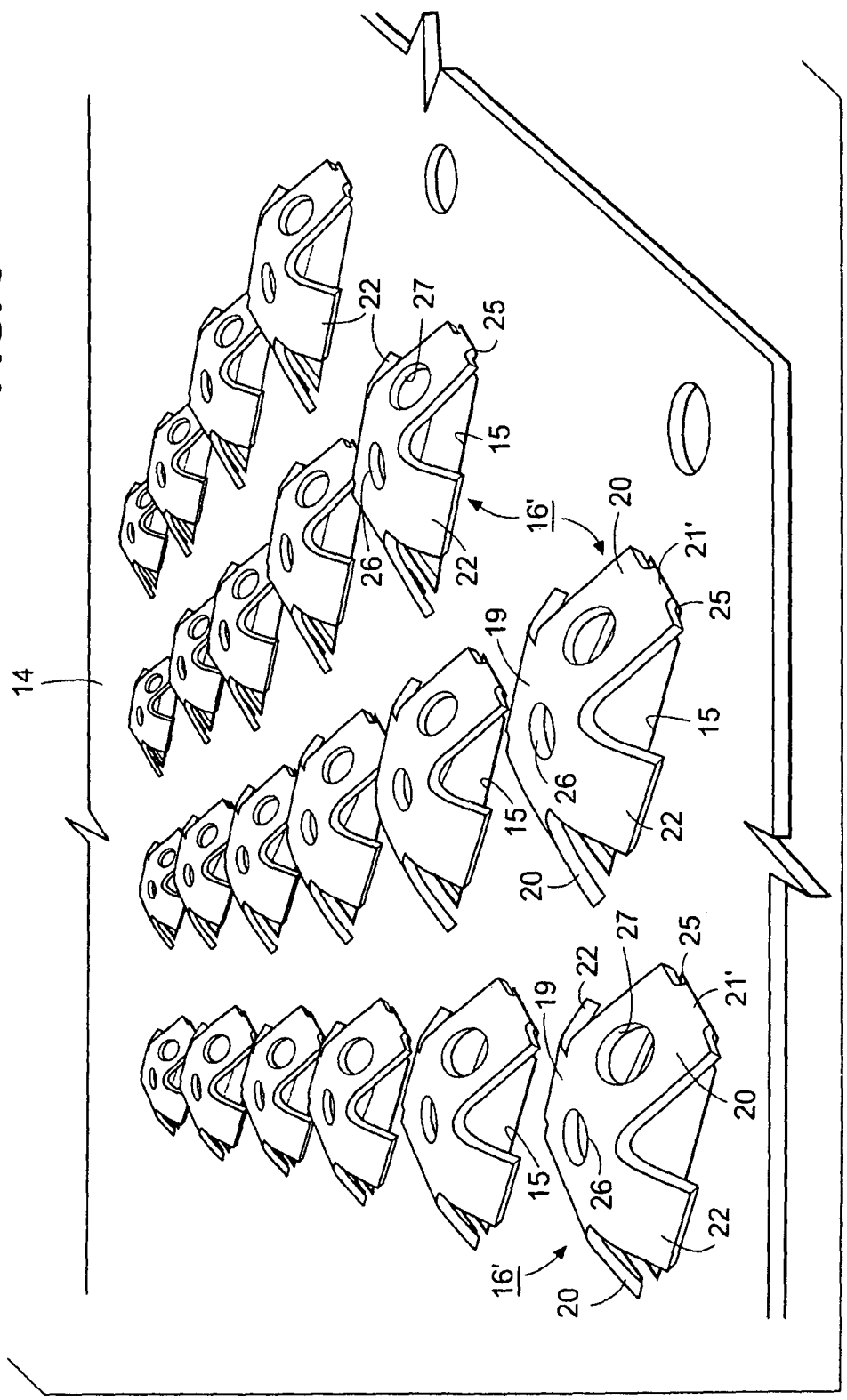
FIG. 3 illustrates a part perspective view of a modified contact tray in accordance with the invention.

Referring to FIG. 3, wherein like reference characters indicate like parts as above, the tray deck 14 may be made with orifices 15 of trapezoidal or rectangular shape with slots 25 disposed adjacent two ends and each valve cover 16' has a central portion 19, a pair of legs 20 at opposite ends of the central portion 19 that slope towards the tray deck 14 and a pair of tabs 21, each of which extends vertically from the end of a sloped leg 20 to pass through a slot 25 in the tray deck 14 adjacent the orifice 15.

Figure 4:
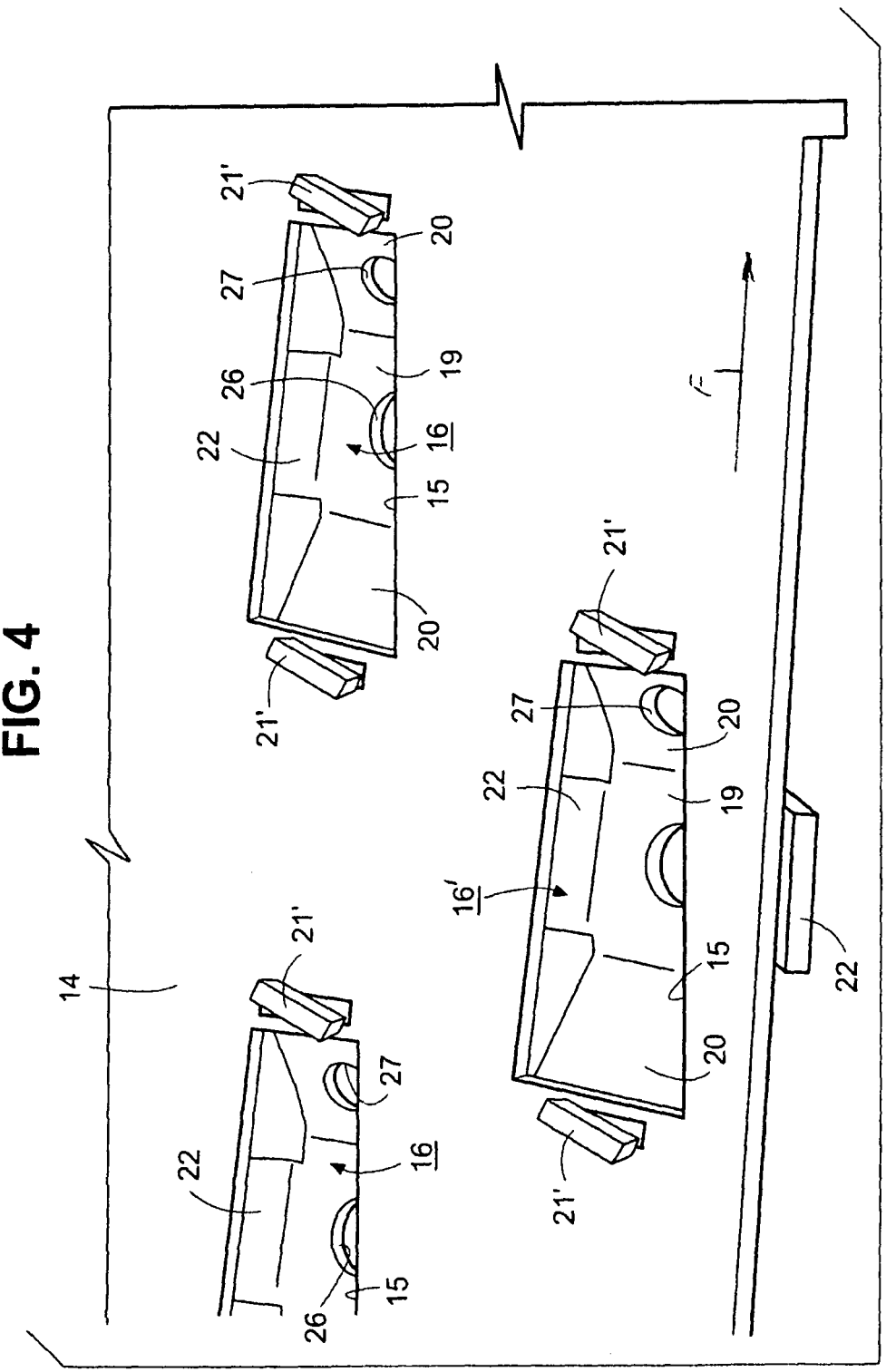
FIG. 4 illustrates a bottom view of the contact tray of FIG. 3.

As indicated in FIG. 4, each orifice 15 is of trapezoidal shape. In this case, as above, leg 20 of the valve cover 16' is narrower that the other leg 20 and positioned on the downstream side of the orifice 15 relative to the direction of liquid flow F. Therefore, the vapor leaving the valve cover 16' has a slight pushing component that helps the liquid move across the tray deck 14.

Alternatively, each orifice 15 may be of rectangular shape with the size being the equivalent of a circular orifice of about 15 mm to 20 mm.

Referring to FIG. 4, each valve cover 16' also has means, for example, in the form of a deformable T-shaped tab 21' extending from a leg 20, for engaging the underside of the tray deck 14 to prevent lifting of the valve cover 16' from the tray deck 14. In this embodiment, the deformable tab 21' is twisted to engage the underside of the tray deck 14.

As shown in FIGS. 3 and 4, each valve cover 16' has an opening 26 in the central portion 19 and an opening 27 in the sloped leg 20 in the front (downstream side) of the valve cover 16'. Alternatively, the valve cover 16' may be made without holes, i.e. of solid construction, as indicated in FIGS. 5 and 6.

Referring to FIGS. 1 to 4, each valve cover 16, 16' is provided with one or more guide vanes 22 on the side of the central portion 19 that extend laterally and downwardly from the central portion 19 towards and in spaced relation to the tray deck 14 for deflecting at least a part of the vapor ascending through a respective orifice 15 towards the tray deck 14, as indicated by the arrows 28 in FIG. 5 and the simulation of FIG. 6.

As indicated in FIG. 6, the guide vanes 22 are constructed to direct a majority of the vapor passing upwardly through an orifice 15 downward towards the tray deck 14. To this end, the width of each guide vane 22 is a major fraction of the width of the central portion 19 and about ⅓ the width of an orifice 15, for example, the width of a guide vane 22 is 15 mm.

In addition, each guide vane 22 is spaced from the tray deck 14 by a distance in a range of from 3 mm to 10 mm with a preferred range of from 3 to 5 mm.

Experimental results have shown that by redirecting the vapor flow from the valve cover 16, a substantial improvement in capacity can be achieved. Specifically, an improvement of approximately 15% can be seen with the configuration of tray deck 14 and valve covers 16 of FIG. 1.

As indicated in FIG. 5, wherein like reference characters indicate like parts as above, each guide vane 22 slopes uniformly towards the tray deck 14 and has a free edge parallel to and spaced from the tray deck 14. The deflected vapor thus exits from under the guide vane 22 in a direction as indicated by the arrow 28 transverse, i.e. perpendicular, to the flow of liquid on the tray deck 14 which is from left to right in FIG. 2. In another embodiment, the guide vane 22 may be folded in such a way as to direct the vapor exiting from under the guide vane in a direction forwardly so that the exiting vapor moves in the direction of liquid flow. For example, the guide vane may extend laterally outwardly from the central portion 19 of the valve cover 16 and the end portion of the guide vane may be folded or bent downwardly about a fold line angularly disposed across the guide vane. In such a case, the depending end portion would have a greater length on one side than at the other side and would be spaced from the tray deck 14 a smaller amount on the one side than on the other side. Alternatively, the depending end portion may be made so as to be equi-spaced from the tray deck 14 along the width thereof while providing a deflecting wall for deflecting the vapor forwardly along the tray deck 14.

The guide vanes 22 may be employed on any suitable valve cover including, but not limited to the embodiments of valve covers described in US 2009/0134533.

Figure 7:
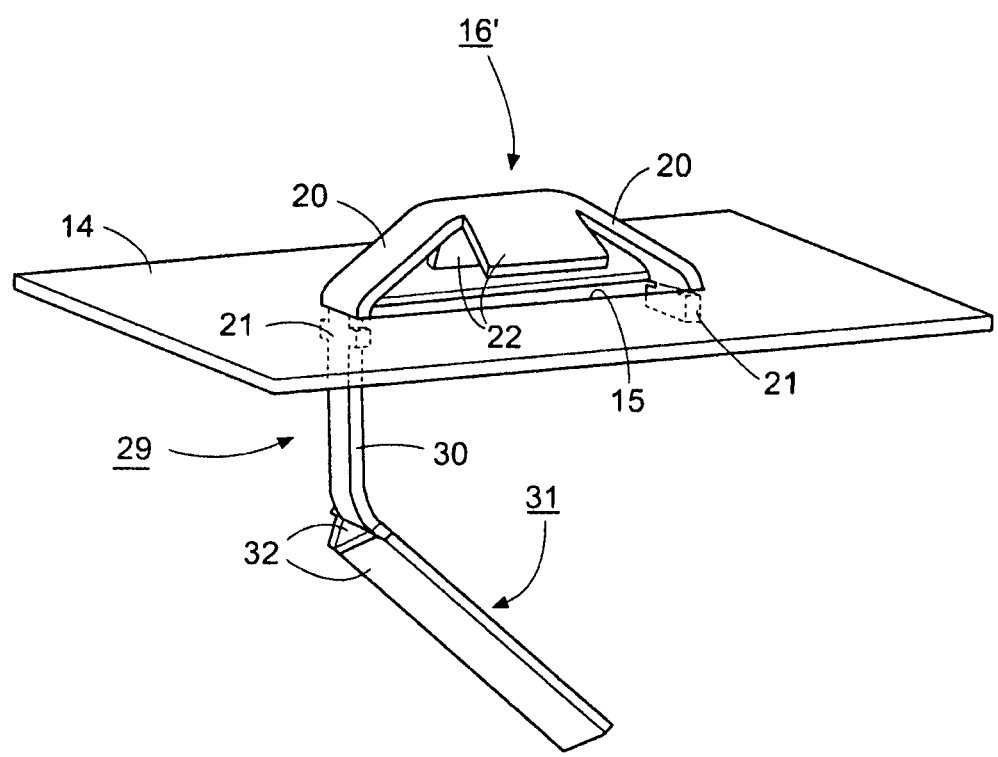
FIG. 7 illustrates a perspective view of a valve cover and integrated de-entrainment device in accordance with the invention.

Further, a de-entrainment device may be employed with any of the above-mentioned valve covers. For example, referring to FIG. 7, each valve cover 16' may be integrated with a de-entrainment device 29 into a one-piece structure. As illustrated, the de-entrainment device 29 extends downwardly from one of the sloped legs 20 and includes a vertically disposed leg 30 integral with the dependent tab 21 of the leg 20 that extends through the tray deck 14. In this case, the tab 21 is not deformable. The de-entrainment device 29 may also be fabricated so as to extend downwardly from both of the sloped legs 20.

The de-entrainment device 29 also has a downwardly angled deflector 31 integral with the bottom of the leg 30 that is disposed in vertical alignment with an orifice 15 in the tray deck 14 and the central portion 19 of the valve cover 16'. The deflector 31 is positioned to collect entrainment before the entrainment reaches the tray deck 14 above and distributes the entrainment back to the tray deck 14 below (not shown).

In the illustrated embodiment, the deflector 31 is formed of a pair of longitudinally extending blades 32 that are disposed in angular relation to each other. Alternatively, the deflector may be formed of a single blade 32 that is disposed at an angle to a horizontal plane and an angle to a vertical plane, e.g. by eliminating one of the blades 32 of the deflector 31.

The integrated structure of valve cover 16' and de-entrainment device 29 may be readily mounted in an orifice 15 of the tray deck 14 by passing the deflector 31 first through the orifice 15 and then turning the structure to position the valve cover 16' over the orifice 15. The deformable tab 21 of the valve cover 16' is the passed through the slot 25 provided therefor in the tray deck 14 and twisted to secure the structure to the tray deck 14.

Figure 8:
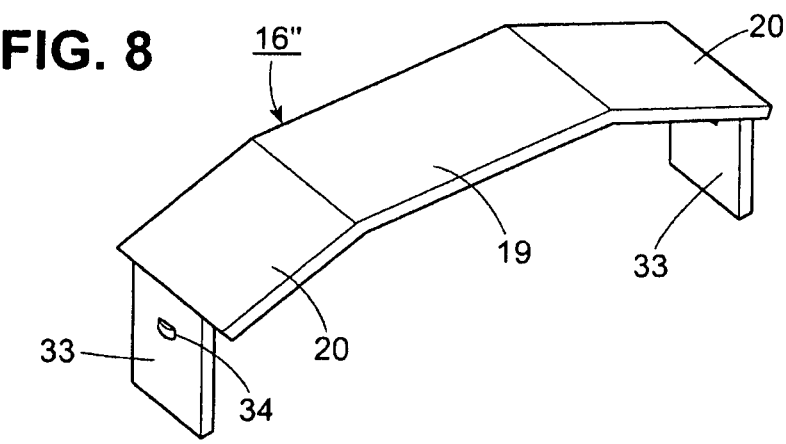
FIG. 8 illustrates a perspective view of a modified valve cover in accordance with the invention.
Figure 9:
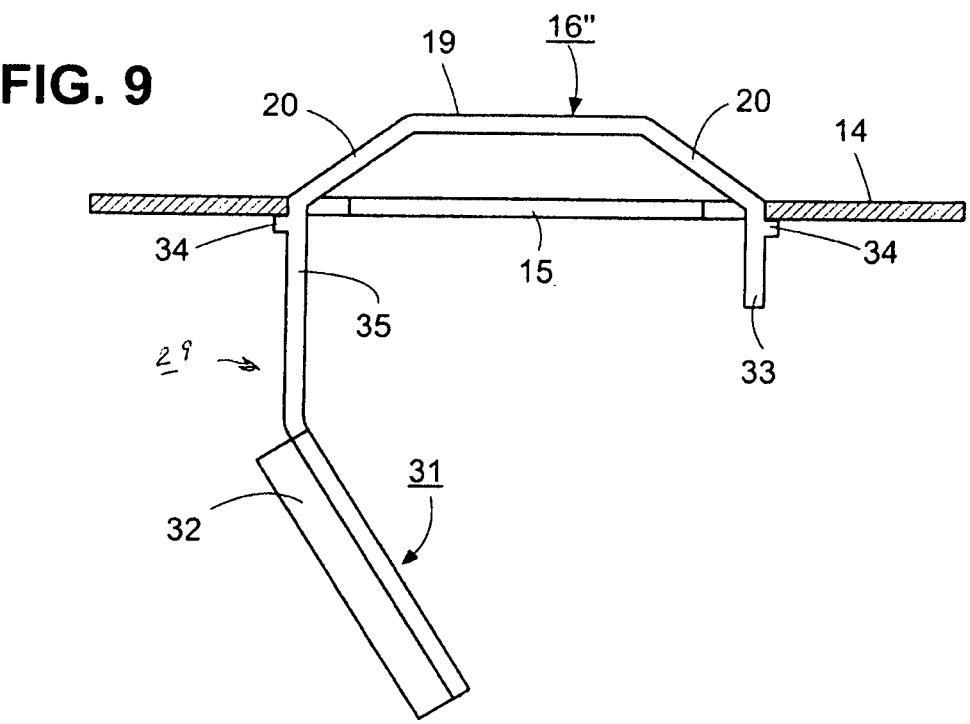
FIG. 9 illustrates a perspective view of the valve cover of FIG. 8 with an integrated de-entrainment device in accordance with the invention.

Referring to FIGS. 8 and 9, wherein like reference characters indicate like parts as above, in another embodiment, the valve cover 16" may be constructed of a central portion 19 and a pair of legs 20 having a sloped portion extending from the central portion 19 and a tab 33 that extends perpendicularly from the sloped portion to pass through the tray deck 14. In order to prevent the valve cover 16" from being blown away from the tray deck 14, each tab 33 is provided with an outwardly extending barb 34 for engaging under the tray 11 when in place. In this embodiment, a de-entrainment device 29 extends downwardly from a tab 33 and below the orifice.

Referring to FIG. 9, in this embodiment, the tab 33 may be elongated to form the vertical leg 30 of the de-entrainment device 29 or may be separately joined to the vertical leg 30 of the de-entrainment device 29.

Figure 10:
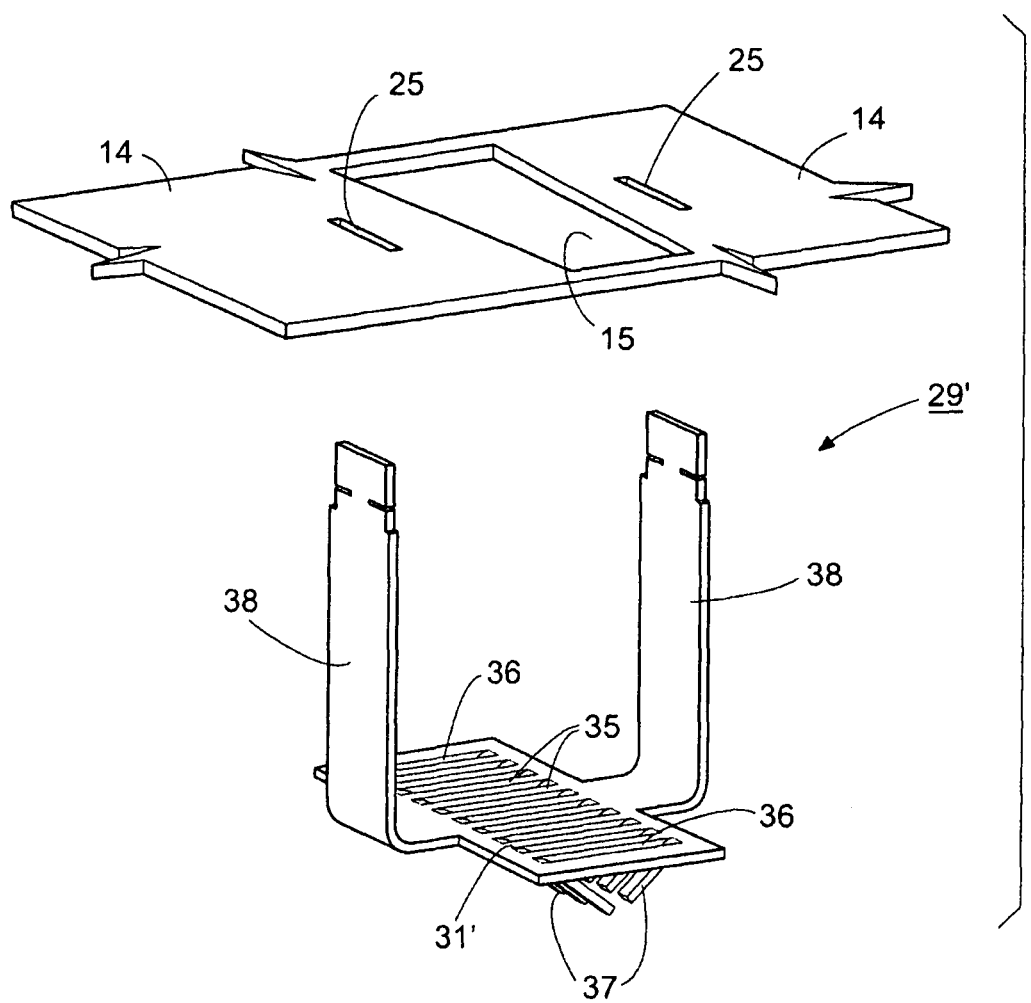
FIG. 10 illustrates a perspective view of a modified de-entrainment device in accordance with the invention.

Referring to FIG. 10, the de-entrainment device 29' may be made with a horizontally disposed deflector 31' of rectangular shape that is fenestrated to have a series of bars 35 separated by slots 36 and pairs of downwardly inclined fingers 37 within each slot 36 and disposed in opposition to each other. As indicated, the fingers 37 are cut out of the deflector 31' to form the slots 36. In this embodiment, the horizontally disposed deflector 31' is aligned vertically below an orifice 15 in the tray deck 14 to shadow the orifice 15 and entrainment collects on the surfaces of the deflector 31' and travels along and down the respective fingers 37 to descend onto the tray below.

As shown in FIG. 10, a pair of fingers 37 is cut from deflector 31' to form a single slot 36 with the fingers 37 disposed in opposite directions relative to each other. As shown, the fingers 37 are disposed in two rows with the fingers 37 on one row being oppositely disposed to the fingers 37 of the other of the two rows. Alternatively, the fingers may be directed in the same direction. In this latter embodiment, each finger would form a single slot.

As above described, the horizontally disposed deflector 31' may extend from a single vertically disposed leg that is integrated with a tab 21 on a leg 20 of a valve cover 16 or, as illustrated, may be suspended by a pair of integral legs 38 from a tray deck 14 above.

The vane-containing valve covers 16 when combined with the de-entrainment devices 29 have been found to achieve an 18% improvement in capacity in air/water showing that the benefits of both these valve modifications are essentially cumulative.

Figure 12:
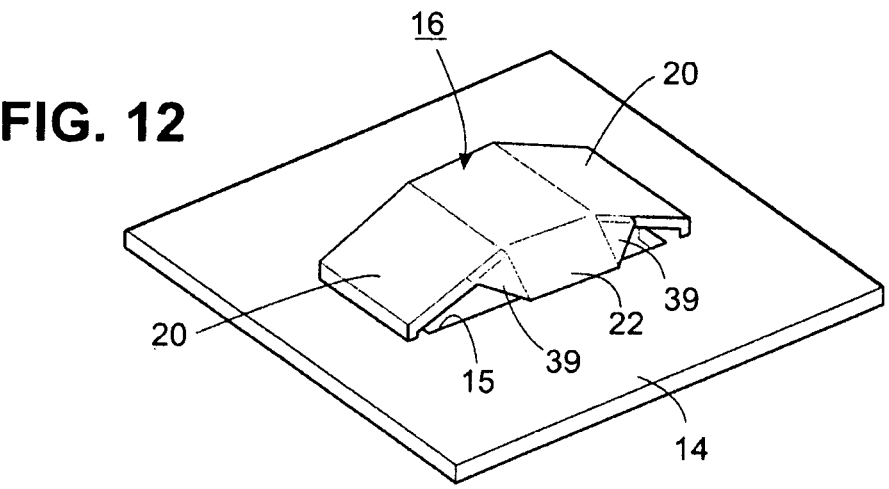
FIG. 12 illustrates a perspective view of a modified valve cover with panels on a tray deck in accordance with the invention.

Referring to FIG. 12, wherein like reference characters indicate like parts as above, the valve cover 16 is provided with a plurality of panels 39, each of which extends between a respective leg 20 and a respective guide vane 22 for deflecting a part of the vapor ascending through an orifice 15 towards the tray deck 14.

By closing off the otherwise open corners between the guide vane 22 and the legs 20, a more uniform vapor flow out of the valve cover 16 should be achieved along with directing of the vapor downward to the tray deck 14.

As indicated in FIG. 12, each panel 39 is of triangular shape and extends over the height of the guide vane 22, i.e. the extent of the guide 22 from the central portion 19, and over one-half the height of a leg 20, i.e. the extent of the leg 20 from the central portion 19 to the surface of the tray deck 14.

Figure 13:
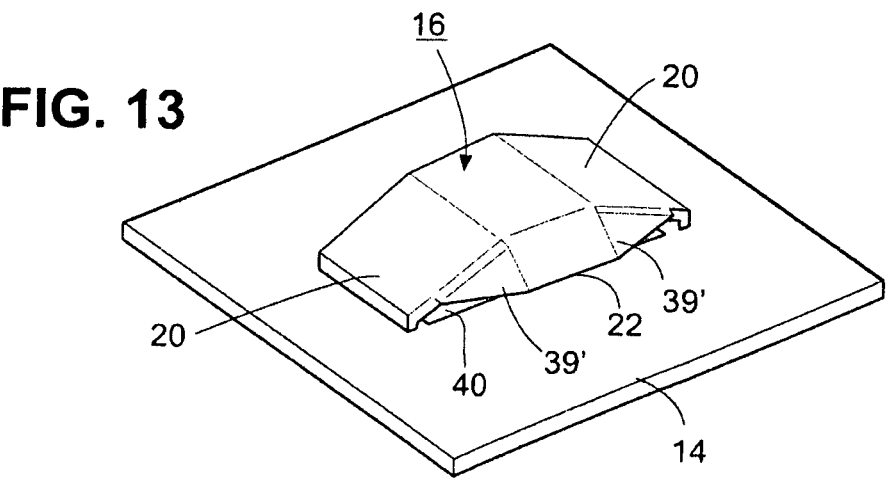
FIG. 13 illustrates a perspective view similar to FIG. 12 of a modified valve cover with larger panels in accordance with the invention.

Alternatively, as indicated in FIG. 13, wherein like reference characters indicate like parts as above, each panel 39' is of triangular shape and greater extent than the panel 39 of FIG. 12. That is, each panel 39' extends over the height of the guide vane 22, i.e. the extent of the guide 22 from the central portion 19, and substantially over the height of a leg 20, i.e. the extent of the leg 20 from the central portion 19 to the surface of the tray deck 14, leaving a small gap 40.

Figure 14:
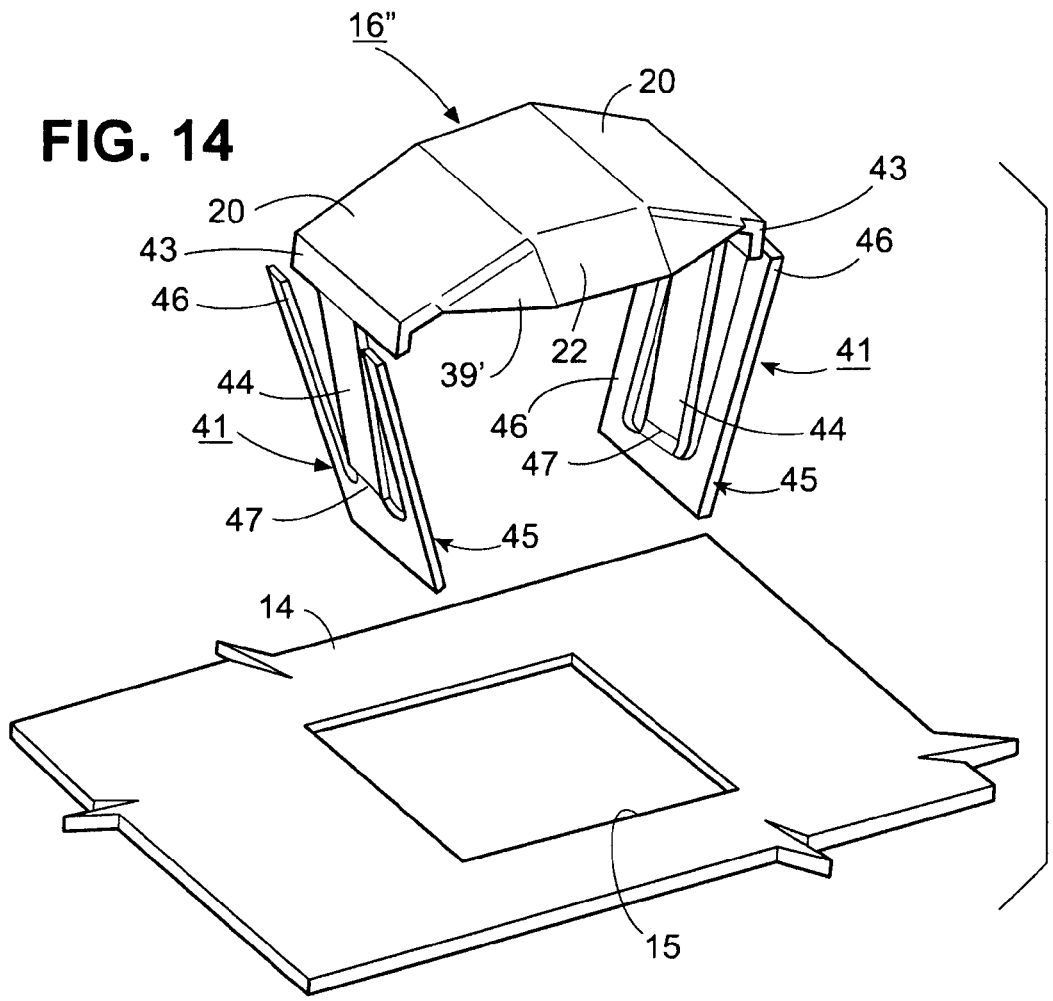
FIG. 14 illustrates a perspective exploded view of a valve cover and tray wherein the valve cover is mounted on the tray to be movable up and down in accordance with the invention.
Figure 15:
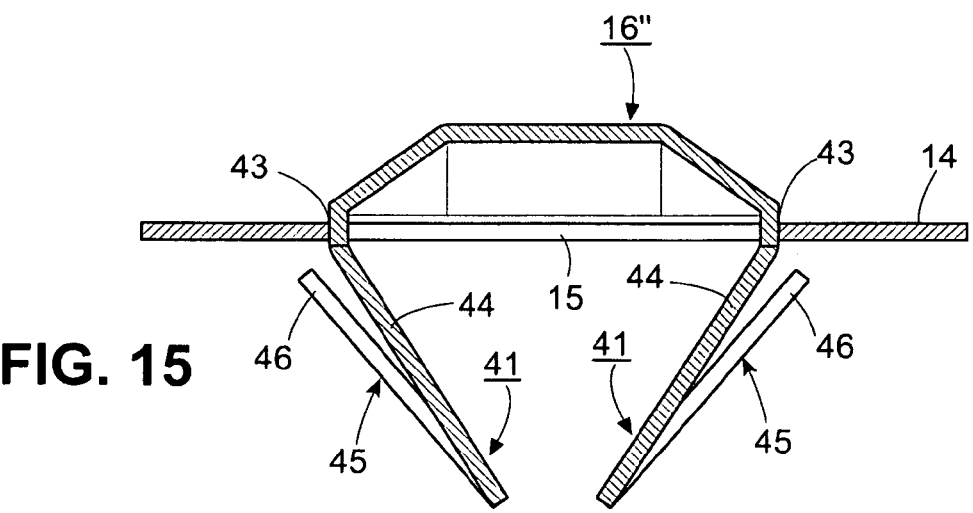
FIG. 15 illustrates a side view of the valve cover of FIG. 14 in place on the tray deck of FIG. 14.

Referring to FIGS. 14 and 15, wherein like reference characters indicate like parts as above, the valve cover 16" is constructed in a manner similar to the valve cover 16 of FIG. 13 and is provided with means for engaging the tray deck 14 to allow lifting, i.e. an up and down movement, of the valve cover 16" from the tray deck 14 a predetermined amount. As illustrated, this means includes a pair of depending extensions 41 that extend from the legs 20 for passing through an orifice 15 in the tray deck 14.

As indicated in FIG. 15, each extension 41 has a first portion 43 that passes through the tray deck 14 and that is perpendicular to the tray deck 14, a narrower second portion 44 that extends downwardly from the first portion 43, through the orifice 15 and angularly towards the second portion of the other extension 41 and a U-shaped portion 45 that extends upwardly from the second portion 44.

As illustrated, the first portion 43 of each extension 41 is sized to pass through the tray deck 14 while the guide vanes 22 seat on the tray deck 14. As shown, each portion 43 is of rectangular shape.

The second portion 44 of each extension 41 is of rectangular shape and extends inwardly under the tray deck 14 so as to form a "diamond" shape with the valve cover 16. This configuration of the extensions 41 prevents the valve cover 16 from lifting out of the tray deck 14 after being installed.

The U-shaped third portion 45 of each extension 41 extends upwardly at a different angle from the second portion 44, e.g. in a direction away from the U-shaped portion 45 of the other extension 41. Each U-shaped portion 45 is of a width to pass through the orifice 15 and defines a pair of prongs 46 for abutting an underside of the tray deck 14 in response to lifting of the valve cover 16 relative to the tray deck 14.

As shown in FIG. 14, a small transition section 47 is disposed between the two portions 44, 45 to facilitate bending of the U-shaped portion at a different angle from the second portion 44.

Referring to FIG. 14, in order to install the valve cover 16, the lower ends of the U-shaped portions 45 are passed through the orifice 15 in the tray deck 14. As the extensions 41 pass through the orifice, the prongs 46 flex inwardly towards each other.

After passing the U-shaped portions 45 through the orifice 15, the prongs 46 are allowed to flex back to the original shape thereby forming a stop to prevent lifting of the valve cover 16 out of the tray deck 14.

Once the valve cover 16" is in place, the guide vanes 22 of the valve cover 16" are seated on the tray deck 14 and the prongs 46 are spaced from the underside of the tray deck 14.

During operation of a tower, an upward flow of vapor through the orifice 15 lifts the valve cover 16" from the tray deck 14 until such time as the prongs 46 come into contact with the underside of the tray deck 14 thereby limiting the lift of the valve cover 16". During this time, the first portions 43 of the two extensions 41 are guided within the orifice 15 so as to prevent lateral movement of the valve cover 16".

Alternatively, the first portion 43 of each extension 41 may be made of a narrower width than the leg 20 from which the portion 43 depends so as to be guided within a notch (not shown) that is formed in the tray deck 14 as an adjunct to the rectangular orifice 15 in order to prevent lateral movement of the valve cover 16" during lifting of the valve cover 16". Alternatively, the first portion 43 of each extension 41 may be sized to seat on the top of the tray deck 14 while the second portion 44 is guided in a notch (not shown) adjoining the orifice 15 in order to prevent lateral movement of the valve cover 16" during lifting of the valve cover 16".

The invention thus provides a valve cover for a contact tray of relatively simple construction and one which increases the capacity of the tray.

The invention further provides a de-entrainment device that improves the entrainment resistance of a contact tray in a tray column.

What is claimed is:

1. A valve cover for a mass transfer column comprising
a central portion for disposition in spaced relation to an orifice for passage of an ascending flow of vapor in a tray deck;
a pair of legs extending downwardly from opposite ends of said central portion;
at least one guide vane extending laterally and downwardly from said central portion for deflecting at least a part of the vapor ascending through a respective orifice towards said tray deck; and
a pair of depending extensions, each said extension including a first portion for passing through said orifice of said deck, a second portion extending downwardly from said first portion and towards a second portion of the other of said pair of extensions and a U-shaped portion extending upwardly from said second portion and defining a pair of prongs spaced from said tray deck a predetermined distance for abutting an underside of said tray deck in response to lifting of said valve cover relative to said tray deck.

2. A valve cover as set forth in claim 1 further comprising a pair of panels, each said panel extending between a respective one of said pair of legs and said guide vane for deflecting a part of the vapor ascending through a respective orifice towards the tray deck.

3. A valve cover as set forth in claim 1 wherein each said U-shaped portion is directed upwardly in a direction away from the U-shaped portion of the other of said pair of extensions.

4. A valve cover as set forth in claim 1 further comprising a pair of said guide vanes extending laterally and downwardly from opposite sides of said central portion and a plurality of panels, each said panel extending between a respective one of said pair of legs and a respective one of said guide vanes for deflecting a part of the vapor ascending through a respective orifice towards the tray deck.

5. In combination,
a tower disposed on a vertical axis; and
a plurality of horizontal tray decks disposed in spaced vertical relation within said tower for receiving flows of liquid thereon, each said tray deck having a plurality of orifices for passage of an ascending vapor therethrough;
a plurality of valve covers mounted on each respective tray deck, each said valve cover having a central portion disposed in spaced relation to a respective orifice in a respective tray deck and at least one guide vane extending laterally and downwardly from said central portion towards and in spaced relation to said respective tray deck for deflecting at least a part of the vapor ascending through a respective orifice towards said respective tray deck; and
a pair of depending extensions on at least some of said valve covers, each said extension including a first portion for passing through a respective orifice of said deck, a second portion extending downwardly from said first portion and towards a second portion of the other of said pair of extensions and a U-shaped portion extending upwardly from said second portion and defining a pair of prongs spaced from a respective tray deck a predetermined distance for abutting an underside of said respective tray deck in response to lifting of said valve cover relative to said respective tray deck.

* * * * *